United States Patent
Leiter

(10) Patent No.: US 12,397,756 B2
(45) Date of Patent: Aug. 26, 2025

(54) BRAKE SYSTEM AND METHOD FOR CONTROLLING A BRAKE SYSTEM

(71) Applicant: HL MANDO CORPORATION, Pyeongtaek (KR)

(72) Inventor: Ralf Leiter, Mendig (DE)

(73) Assignee: HL MANDO CORPORATION, Pyeongtaek (KR)

( * ) Notice: Subject to any disclaimer, the term of this patent is extended or adjusted under 35 U.S.C. 154(b) by 75 days.

(21) Appl. No.: 17/523,820

(22) Filed: Nov. 10, 2021

(65) Prior Publication Data

US 2022/0144228 A1    May 12, 2022

(30) Foreign Application Priority Data

Nov. 11, 2020 (DE) .................. 10 2020 129 799.8

(51) Int. Cl.
*B60T 8/171* (2006.01)
*B60T 8/176* (2006.01)
*F16D 66/00* (2006.01)

(52) U.S. Cl.
CPC .............. *B60T 8/171* (2013.01); *B60T 8/176* (2013.01); *B60T 2270/10* (2013.01); *B60T 2270/30* (2013.01); *F16D 2066/001* (2013.01)

(58) Field of Classification Search
CPC ...... B60T 8/171; B60T 8/176; B60T 2270/10; B60T 2270/30; F16D 2066/001
See application file for complete search history.

(56) References Cited

U.S. PATENT DOCUMENTS

| 4,649,370 | A | * | 3/1987 | Thomason | ............... F16D 66/00 439/502 |
| 5,909,171 | A | * | 6/1999 | Kyrtsos | .................. F16D 66/00 188/1.11 R |
| 6,125,318 | A | * | 9/2000 | Zierolf | ................... B60T 8/1703 701/91 |
| 2014/0165350 | A1 | * | 6/2014 | O'Neil | .................. B24B 39/00 29/90.01 |
| 2018/0037210 | A1 | * | 2/2018 | Hecker | ................... B60T 17/22 |

FOREIGN PATENT DOCUMENTS

DE    102008032544 A1 *  2/2009 .......... B60T 8/17616

OTHER PUBLICATIONS

English Translation of DE102008032544A1 (Year: 2008).*

* cited by examiner

*Primary Examiner* — Andrew J Cromer
(74) *Attorney, Agent, or Firm* — Harvest IP Law, LLP

(57) ABSTRACT

The invention relates to a brake system for a vehicle, comprising at least one brake (1a-1f), at least one sensor (3a-3l) for measuring a temperature of the at least one brake (1a-1f), and a control unit (4). The control unit (4) is configured for receiving an actuating signal demanding a brake actuation, and for receiving temperature data from the at least one sensor (3a-3l), indicating the temperature measured by the at least one sensor (3a-3l). The control unit (4) is further configured for effecting a brake torque of the at least one brake (1a-1f) based on the actuating signal. The control unit (4) is furthermore configured for controlling the brake torque of the at least one brake (1a-1f) based on the temperature data. The invention also relates to a method for controlling a brake system of a vehicle.

13 Claims, 1 Drawing Sheet

BRAKE SYSTEM AND METHOD FOR CONTROLLING A BRAKE SYSTEM

CROSS-REFERENCE TO RELATED APPLICATION

Figure 1:
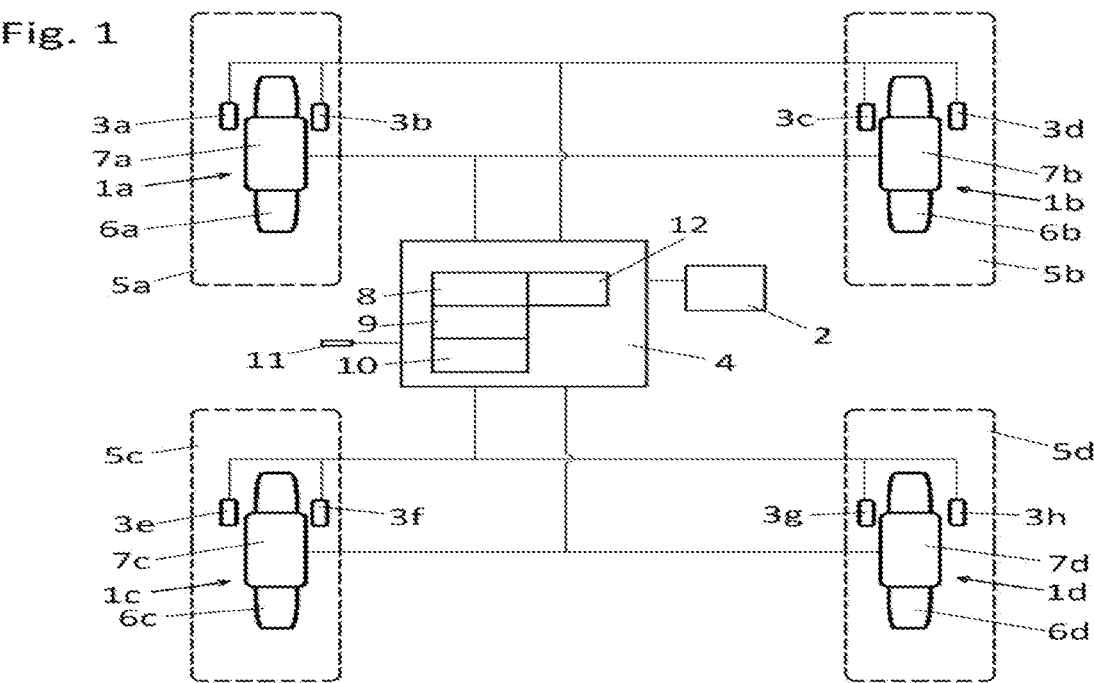

This application claims priority to German Patent Application No. 10 2020 129 799.8 filed on Nov. 11, 2020, the disclosure of which is incorporated herein by reference in its entirety.

The invention relates to a brake system and a method for controlling a vehicle brake, wherein a brake torque may be controlled based on temperature data.

Brake force sensors are known, which measure a pressing force between friction parts of a brake, such as between a brake pad and a brake disk. A resulting braking effect, however, depends on a number of factors, such as the speed of the vehicle, the condition of the brake pad and the brake disk, external conditions, such as weather conditions. It is a drawback of known systems that they do not take into account factors besides the pressing force.

In view of the prior art, the brake system and method described herein are aimed at improving monitoring of a brake system.

This is solved by a brake system for a vehicle according to embodiments of the present disclosure. The embodiments are described in the following description and figures.

The brake system comprises at least one brake, at least one sensor for measuring a temperature of the at least one brake, and a control unit. The control unit is configured for receiving an actuating signal demanding a brake actuation, and for receiving temperature data from the at least one sensor, indicating the temperature measured by the at least one sensor. The control unit is configured for effecting a brake torque of the at least one brake based on the actuating signal. Furthermore, the control unit is configured for controlling the brake torque of the at least one brake based on the temperature data.

The method for controlling a brake system of a vehicle may for instance be used for controlling the above-described brake system, which may optionally have one or more of the further features described herein.

The method comprises the steps:
receiving an actuating signal demanding a brake actuation,
receiving temperature data indicating a temperature of at least one brake of the brake system,
effecting a brake torque of the at least one brake based on the actuating signal and controlling the brake torque based on the temperature data.

The above-described use of the temperature data for controlling the brake torque enables for instance taking into account influencing factors which manifest themselves in the temperature or in a change of the temperature, and it enables controlling the braking in response thereto. For example, external conditions, such as outside temperature and/or conditions relating to the brake, such as heating of the brake due to use of the brake, may be detected and considered by the electronic control unit and/or within the method or by the system, when controlling the brake torque. For instance, the brake system and/or the method enable reacting to wear and/or failure and/or stress and/or a driving situation, which may be inferred from the temperature data.

The temperature data may for example be collected and stored over time, for instance with a temporal resolution as described below, in order to detect changes in temperature. The system or method then enables reacting to temperature changes and influencing temperature changes.

The brake torque which is effected and controlled corresponds to the friction force exerted at the friction part and/or by way of the friction part, multiplied by the radius from a wheel hub at which it acts. For instance, the force exerted may be the force applied by a caliper, which presses a set of brake pads to a brake disk, the brake pads and the brake disk being examples of friction parts. It is also possible to have, for instance, a drum brake wherein the force acts between a brake shoe and a drum, at the radius from the wheel hub, the brake show and the drum being examples of friction parts. If the brake torque is controlled, the friction force may be altered, i.e. increased or reduced.

It is an advantage of the invention that the temperature of the brake, in particular the temperature change of the brake, may serve as a reliable indicator for the current brake torque, and may provide a more meaningful picture of the parameters of the brake cycle. It may be an advantage of the invention that other types of brake torque measurement sensors or brake force measurement sensors can be avoided. Control of the brake torque, based on the temperature data, can for example help to increase passenger safety.

The system or the method can enable function monitoring of the brake system, and it may be configured to detect failure or wear.

Within the system or within the method, for a given actuating signal, the brake torque of the at least one brake may be controlled in a closed loop control. For example, as the temperature data is received during brake application, the brake torque may be adjusted in order to increase or reduce the temperature in the at least one brake. As this adjustment of the brake torque results in a change of temperature, this change of temperature is again recorded and may prompt a further adjustment of the brake torque, and so on. The process may be terminated when the actuating signal stops, and the brakes may be fully released.

The actuating signal demands a brake actuation. For example, an actuating device may be provided, which comprises, for instance, a brake pedal. Therein, the actuating force for example corresponds to or depends on the force exerted onto the brake pedal by a driver of the vehicle. The actuating device may also comprise or be connected to a different user input, such as a joystick, wherein the actuating force depends on the driver's handling of the user input. The brake system, in particular the electronic control unit, may also comprise or be connected to an automatic vehicle control, such as an autopilot or a distance assistant, capable of actuating the vehicle's brake system. Such an automatic vehicle control may produce the actuating signal and demand braking the vehicle, in particular without a user input, for instance in response to an automatically detected driving situation, such as an emergency-situation. In all of these cases, the control of the brake torque as described above may be carried out, in particular the closed loop control thereof, while the actuating signal, initiated by the user or by the automatic vehicle control, persists.

The at least one brake may include a first brake for braking a first wheel of the vehicle and a second brake for braking a second wheel of the vehicle. The at least one sensor may include one or more first sensors for measuring at least one first temperature of the first brake and one or more second sensors for measuring at least one second temperature of the second brake. The control unit may be configured for controlling the brake torque of the first brake and/or for the second brake based on the temperature data, wherein the temperature data includes the first and second temperatures. This allows controlling for instance the first brake, based on temperature data relating to the first brake itself and based on temperature data relating to the second brake, in particular based on a temperature change detected in the first brake itself and/or based on a temperature change detected in the second brake. A control may in particular take place based on a comparison of temperatures or temperature changes of the first brake and the second brake. Specifically, as part of the control, the brake torque of the first brake and/or the second brake may be adapted, if it is determined that a temperature change in the first brake deviates from a temperature change in a second brake. A temperature change in either of the brakes, resulting from an adaptation of the brake torque in either of the brakes, may be monitored by way of the first and second sensors, and a consecutive control of the brake torques may be carried out in response thereto, as part of a closed loop control.

The first wheel may for instance be a front wheel of the vehicle while the second wheel is a rear wheel of the vehicle, and the control unit may be configured for adapting a front/rear brake-torque distribution based on the temperature data. Alternatively or additionally, the first wheel may be a left wheel of the vehicle and the second wheel may be a right wheel of the vehicle and the control unit may be configured for adapting a left/right brake-torque distribution based on the temperature data. Transfer-factors for the front/rear-adjustment or the left/right-adjustment may be extracted by comparing the measured to a temperature model, such as the temperature model described herein.

In an example, the at least one brake comprises four brakes, each equipped with one or two or more than two sensors for measuring the temperature of the respective brake. Additionally or alternatively, each of the brakes may be controlled based on the temperature data relating to the brake itself and/or based on the temperature data relating to one or more of the other brakes.

The at least one sensor may have a temporal resolution of less than one second, or less than 0.1 seconds, or less than 0.01 seconds. Additionally or alternatively, the control unit may be configured for adapting the brake torque for the at least one brake within less than one second, or within less than 0.1 seconds, or within less than 0.01 seconds after a change in the temperature is detected by the at least one sensor, as part of the control. In particular, the above-described control, in particular including adjustment of the brake torque in reaction to a detected temperature or temperature change, may be enabled on time-scales that are relevant for an ABS system, wherein a change in temperature may for instance be detected over the course of a single apply-release cycle.

The at least one sensor may be configured for measuring the temperature at a friction part of the at least one brake. In particular, the friction part may be a brake disk. The friction part may also be a brake pad, a brake drum, a brake shoe, or the like. In particular, temperature changes detected at a brake disk or at a brake drum surface have been found to be relevant indicators for the actual brake cycle and for the current brake torque. The sensors may also be arranged at the brake pads or integrated into the brake pads. It may be envisioned to measure the temperature in several parts or at several places pertaining to the same brake. This for instance allows detection of brake-internal issues, for instance if uneven heating is detected. For instance, it is possible within the brake system, that the at least one sensor comprises two sensors for measuring the temperature on two opposing sides of the friction part. In particular this may be done on opposing sides of a brake disk.

The at least one sensor may be a contact sensor. For instance, the at least one sensor may be a sliding sensor or an integrated sensor. The at least one sensor may also be a contactless sensor. For instance, the at least one sensor may be a pyrometer.

Within the brake system, or within the method, a temperature model may be provided for the at least one brake, for instance within a memory of the control unit. The temperature model may be a temperature model for the friction part, in particular for a brake disk of the brake. The at least one sensor may be configured for measuring the temperature of the at least one brake at this friction part, and the control unit may compare the measured temperature and/or detected temperature changes to the temperature model. In particular, the control unit may be configured for comparing changes of the measured temperature with the temperature model, and the control unit may be configured for adjusting control of the brake torque(s) based on a deviation of the temperature changes from the temperature model. For example, in reaction to a temperature increase detected in one of the at least one brake, the brake torque may be reduced. Specifically, this may be done if the temperature increases beyond a threshold or if it increases faster than a predetermined change rate (ΔTemperature/ΔTime). The threshold and/or the predetermined change rate may for instance be contained within or extracted from the temperature model. As part of the closed loop control, an effect of an adjustment of the brake torque(s) on the temperature can be determined and compared to the temperature model. A further adjustment of the brake torque(s) may then be performed in response thereto, thereby iteratively closing in on a desired temperature or temperature change rate.

The control unit may be configured for receiving outside temperature data and it may be configured for adjusting control of the brake torques based on the outside temperature data. This may be done, for instance, by configuring the control unit for calibrating the temperature model for the at least one brake based on the outside temperature. This may for instance help to improve braking after parking or during extreme weather. In particular, after long parking a calibration, taking into account the outside temperature, may take place.

The control unit may be configured for receiving motion data and it may be configured for adjusting control of the brake torque(s) based on the motion data. The motion data may for instance indicate a vehicle speed or changes in vehicle speed over time. For example, control of the brake torque(s) may be adjusted based on a current vehicle speed and/or the temperature model for the at least one brake may be calibrated based on the motion data. The motion data may include a vehicle motion history. The vehicle motion history may for instance be recorded over several seconds or minutes or hours. Vehicle motion history recorded over a longer time, such as hours, may enable reacting to parking or to driving large distances, in particular by (re-) calibrating the temperature model. Vehicle motion history recorded over a shorter time, such as seconds or minutes, as well as current motion data, may enable reacting to the present driving situation, by taking into account expected loads and forces during braking, which may depend on, for instance, the vehicle speed.

In the brake system and/or according to the method, an ABS-system and/or ESC-system may be controlled based on the temperature data, in particular based on the first and second temperature data. This may include that the braking procedures that are determined and/or influenced by such ABS- or ESC-systems, are further controlled and thus adjusted based on the temperature data.

It should be noted that features described herein in conjunction with the brake system may also be claimed for the method and vice versa.

The brake system and method are illustrated in an exemplary fashion in the appended figures. Therein, FIG. 1 shows a brake system for a vehicle, and FIGS. 2(a) and FIG. 2(b) show brakes for the brake system, comprising different types of sensors.

Figure 2A:
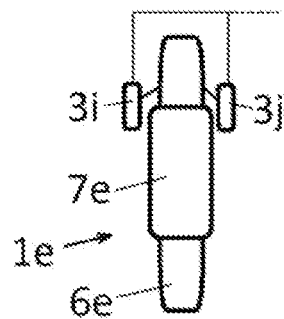
Figure 2B:
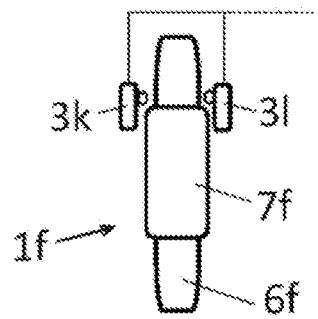

FIG. 1 schematically depicts a brake system for a vehicle. The vehicle has four wheels 5a, 5b, 5c, 5d, each of which is equipped with a brake 1a, 1b, 1c, 1d, pertaining to the brake system. The brakes 1a, 1b, 1c, 1d are carried out as disk brakes, each having a brake disk 6a, 6b, 6c, 6d and a caliper 7a, 7b, 7c, 7d holding brake pads which can be pressed against the respective brake disk 6a, 6b, 6c, 6d for braking. The brakes 1a, 1b, 1c, 1d are in communication with a control unit 4, which, in turn, is connected to an actuating device 2 comprising a brake pedal. If the brake pedal of the actuating device 2 is actuated, the control unit 4 receives a corresponding actuating signal demanding a brake actuation, which actuating signal indicates an actuating force that is applied to the brake pedal of the actuating device. Depending on the amount of actuating force applied to the pedal, the brake system aims at stronger or gentler deceleration. The control unit 4 is also connected to an automatic vehicle control 12 which, when turned on, is able to send the actuating signal to the electronic control unit 4, demanding a brake actuation. If an actuating signal is received by the control unit 4, the control unit 4 effects a brake torque for each of the brakes 1a, 1b, 1c, 1d based on the actuating signal.

The brake system furthermore comprises a plurality of sensors 3a, 3b, 3c, 3d, 3e, 3f, 3g, 3h for measuring a temperature of the brakes 1a, 1b, 1c, 1d. Specifically, for each of the brakes 1a, 1b, 1c, 1d a pair of sensors is provided, measuring a temperature on opposing sides of the brake. The sensors may for instance be carried out as shown in FIG. 2(a) or FIG. 2(b). Temperature data, which indicates the temperature measured by each sensor 3a, 3b, 3c, 3d, 3e, 3f, 3g, 3h, is forwarded to the control unit 4. Based on the temperature data which is received by the control unit 4, the control unit 4 controls the brake torque of the brakes 1a, 1b, 1c, 1d.

The control unit 4 thus carries out a method for controlling the brake system, wherein it receives an actuating signal demanding a brake actuation. Within the method, the control unit 4 furthermore receives the temperature data indicating the temperature of the brakes 1a, 1b, 1c, 1d of the brake system, and the control unit 4 effects a brake torque of the brakes 1a, 1b, 1c, 1d based on the actuating signal and controls the brake torque based on the temperature data.

For a given actuating signal, in particular while the actuating signal lasts due to, for instance, continued application of force to the brake pedal, the brake torque of the at least one brake is controlled in a closed loop control. As the temperature data is received during brake application, the brake torque is continuously adjusted in order to increase or reduce the temperature in the brakes 1a, 1b, 1c, 1d. As this adjustment of the brake torques results in a change of temperature for each of the brakes 1a, 1b, 1c, 1d, this change of temperature is again detected by the sensors 3a, 3b, 3c, 3d, 3e, 3f, 3g, 3h and, if determined necessary by the control unit 4, may prompt a further adjustment of the brake torque, and so on. The process may be terminated when the actuating signal stops. The brakes are then fully released.

In a possible braking scenario, this may mean that, while the actuating signal remains unchanged, the brake torque of one or more of the brakes 1a, 1b, 1c, 1d is changed in response to the temperature data. If a change in brake torque occurs for one of the brakes 1a, 1b, 1c, 1d, this may be in response to the temperature measured for that same brake, and/or in response to the temperature measured for one or all of the other brakes.

The control unit 4 is configured for adapting a front/rear brake-torque distribution and a left/right brake-torque distribution based on the temperature data.

The sensors 3a, 3b, 3c, 3d, 3e, 3f, 3g, 3h each have a temporal resolution of less than 0.1 seconds, or of less than 0.01 seconds, and the control unit 4 is configured for adapting the brake torque for the brakes 1a, 1b, 1c, 1d within less than 0.1 seconds, or within less than 0.01 seconds, after a change in the temperature is detected by any one of the sensors 3a, 3b, 3c, 3d, 3e, 3f, 3g, 3h.

The brake system includes an ABS 8 and an ESC 9, each of which is controlled based on the temperature data received by the sensors 3a, 3b, 3c, 3d, 3e, 3f, 3g, 3h. Specifically, if a brake actuation includes a control of the brakes by way of the ABS 8 or the ESC 9, the brake torques associated with this brake actuation are altered by the ABS 8 or the ESC 9, respectively. On top of this, a further control of the brake torques based on the temperature data takes place, in particular a closed loop control as described above, which further control aids the ABS 8 or the ESC 9.

The control unit 4 has a memory 10 containing a temperature model for the brakes 1a, 1b, 1c, 1d, including temperature models for the brake disks 6a, 6b, 6c, 6d of the brakes 1a, 1b, 1c, 1d, at which the temperatures are measured. The control unit 4 is configured for comparing changes of the measured temperature with the temperature model, and the control unit 4 is configured for adjusting control of the brake torque(s) based on a deviation of the temperature changes from the temperature model.

The brake system comprises a thermometer 11 configured for measuring an outside temperature. The control unit 4 receives outside temperature data form the thermometer 11 and adjusts control of the brake torque(s) based on the outside temperature data. This is done by calibrating the temperature model for the brakes 1a, 1b, 1c, 1d based on the received outside temperature.

The control unit 4 is also connected to a vehicle control and receives motion data, including data indicating a current vehicle speed, from the vehicle control. The control unit 4 adjusts control of the brake torques further, based on the motion data.

FIG. 2(a) and FIG. 2(b) show, in each case, a single disk brake 1e, 1f, each comprising a brake disk 6e, 6f and a brake caliper 7e, 7f. The brakes 1e, 1f are each equipped with a pair of sensors, 3i and 3j on the one hand, and 3k and 3l, on the other hand. One or all of the brakes 1a, 1b, 1c, 1d shown in FIG. 1 and their respective sensors 3a, 3b, 3c, 3d, 3e, 3f, 3g, 3h may be designed as shown in FIG. 2(a) or in FIG. 2(b).

The brake 1e of FIG. 2(a) comprises two sensors 3i, 3j, configured for measuring the temperature on opposing sides of the brake disk 6e. The sensors 3i, 3j are designed as contact sensors, namely sliding sensors, having a contact member in touching engagement with the brake disk 6e.

The brake 1f of FIG. 2(b) comprises two sensors 3k, 3l, configured for measuring the temperature on opposing sides of the brake disk 6f. The sensors 3i, 3j are each designed as contactless sensors, namely pyrometers, comprising a thermographic camera device.

LIST OF REFERENCE NUMERALS 1a-1f brake
2 actuating device
3a-3l sensor
4 control unit
5a-5d wheel
6a-6f brake disk
7a-7f brake caliper
8 ABS
9 ESC
10 memory
11 thermometer
12 automatic vehicle control

The invention claimed is:

1. A brake system for a vehicle, comprising
a brake for braking a wheel of the vehicle,
two sensors configured for measuring a temperature at a friction part of the brake, and
a control unit,
wherein the control unit is configured for receiving an actuating signal demanding a brake actuation, and for receiving temperature data from the two sensors, indicating the temperature measured by the two sensors,
wherein the control unit is configured for effecting a brake torque of the brake based on the actuating signal,
wherein the control unit is configured for controlling the brake torque of the brake based on the temperature data,
wherein the temperature includes a left side temperature on a left side surface in the friction part and a right side temperature on a right side surface of the friction part,
wherein the two sensors comprise a left side sensor for measuring the left side temperature on the left side surface in the friction part and the right side sensor for measuring the right side temperature on the right side surface in the friction part, the left side surface in the friction part and the right side surface in the friction part being two side surfaces opposing and corresponding to each other based on a rolling direction of the wheel, and a brake disk being disposed between the left side surface and the right side surface, and
wherein the friction part comprises a caliper, and the two sensors measure the temperatures on the left side surface and the right side surface, respectively, of the same caliper,
wherein the two sensors are contact sensors; and,
wherein the brake system detects an internal issue of the brake when uneven heating is detected between the left side surface and the right side surface of the same caliper based on a difference between the left side temperature on the left side surface and the right side temperature on the right side surface of the same caliper.

2. The brake system according to claim 1, wherein, for a given actuating signal, the brake torque of the brake is controlled in a closed loop control.

3. The brake system according to claim 1, wherein the two sensors have a temporal resolution of less than one second, preferably less than 0.1 seconds, particularly preferably less than 0.01 seconds and wherein the control unit is configured for adapting the brake torque for the brake within less than one second, preferably less than 0.1 seconds, particularly preferably less than 0.01 seconds after a change in the temperature is detected by the two sensors.

4. The brake system according to claim 1, wherein the two sensors are sliding sensors, or integrated sensors.

5. The brake system according to claim 1, wherein an ABS and/or ESC system is controlled based on the temperature data.

6. The brake system according to claim 1, wherein the control unit has a memory containing a temperature model for the brake, wherein the control unit is configured for comparing changes of the measured temperature with the temperature model, and wherein the control unit is configured for adjusting control of the brake torque(s) based on a deviation of the temperature changes from the temperature model.

7. A brake system for a vehicle according to claim 6,
wherein the temperature model includes a predetermined change rate of temperature over time (ΔTemperature/ΔTime), and
wherein the control unit is configured for comparing a change rate calculated based on the changes of the measured temperature and the predetermined change rate of temperature and adjusting control of the brake torque(s) based on the comparison.

8. The brake system according to claim 1, wherein the control unit is configured for receiving outside temperature data at outside of the vehicle and is configured for adjusting control of the brake torque(s) based on the outside temperature data, in particular by calibrating a/the temperature model for the brake based on the outside temperature.

9. The brake system according to claim 1, wherein the control unit is configured for receiving motion data, in particular indicating a vehicle speed, and wherein the control unit is configured for adjusting control of the brake torque(s) based on the motion data.

10. The brake system for a vehicle according to claim 9,
wherein the motion data includes vehicle motion history including the vehicle speed,
wherein the control unit has a memory containing a temperature model for the brake,
wherein the control unit is configured for calibrating the temperature model based on the vehicle motion history and adjusting control of the brake torque(s) based on a deviation of the measured temperature from the calibrated temperature model.

11. A method for controlling a brake system of a vehicle, in particular a brake system according claim 1, comprising the steps:
receiving an actuating signal demanding a brake actuation,
receiving temperature data indicating a temperature of the brake of the brake system,
effecting a brake torque of the brake based on the actuating signal and controlling the brake torque based on the temperature data.

12. The brake system for a vehicle according to claim 1, wherein one of the left side surface and the right side surface is a surface located in an interior side of the vehicle while the other one of the left side surface and the right side surface is a surface located in an exterior side of the vehicle.

13. The brake system for a vehicle according to claim 1, wherein, when a virtual plane is defined as a plane overlapping with the brake disk, the left side surface is located in one side of the virtual plane and the right side surface is located in an opposite side of the virtual plane.

* * * * *